United States Patent [19]
Stemme et al.

[11] 4,220,405
[45] Sep. 2, 1980

[54] CAMERA SETTING DEVICE

[75] Inventors: Otto Stemme, Munich; Peter Lermann, P. Feldkirchen; Karl Wagner, Munich; Dieter Engelsmann, Unterhaching, all of Fed. Rep. of Germany

[73] Assignee: Agfa-Gevaert AG, Leverkusen, Fed. Rep. of Germany

[21] Appl. No.: 10,017

[22] Filed: Feb. 7, 1979

[30] Foreign Application Priority Data

Feb. 9, 1978 [DE] Fed. Rep. of Germany ....... 2805515

[51] Int. Cl.² .................... G03B 7/24; G03B 17/26
[52] U.S. Cl. .................. 354/21; 352/78 C; 354/37; 354/41; 354/58; 354/202; 354/275
[58] Field of Search ............... 352/78 C; 354/37, 41, 354/58, 202, 275, 21

[56] References Cited
U.S. PATENT DOCUMENTS 3,485,157 12/1969 Nerwin ............................ 352/78 C
3,524,392 8/1970 Langnau et al. ................. 352/78 C Primary Examiner—J. V. Truhe
Assistant Examiner—Shelley Wade
Attorney, Agent, or Firm—Michael J. Striker

[57] ABSTRACT

An arrangement for setting camera functions in dependence upon a characteristic of film being used in the camera. The arrangement includes a manually operable setting knob which can be turned to a plurality of settings and is arrested in each by an arresting device. This knob is used when the film cassette employed in the camera has no film-characteristic (e.g., film speed) mark. When the cassette does have such a mark, the insertion of the cassette into the film chamber of the camera causes disengagement of the arresting device and automatic turning of the knob to a position corresponding to the detected mark. Since the knob is visible to the user it serves as an indicator of the film in the camera, whether the camera setting is manually or automatically made.

5 Claims, 1 Drawing Figure

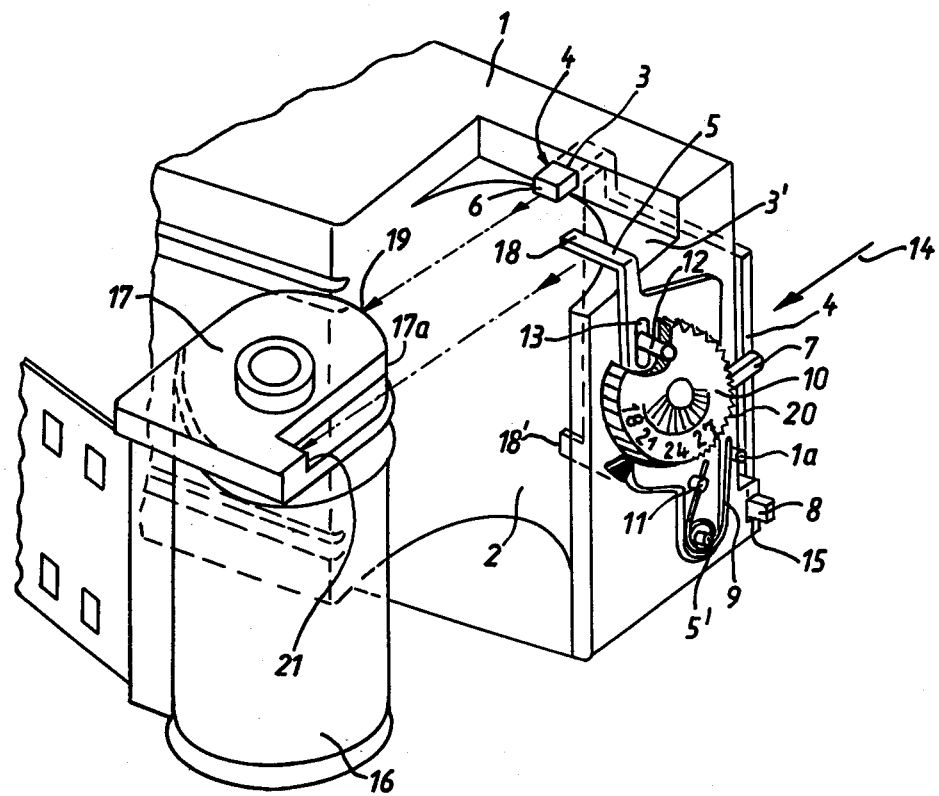

CAMERA SETTING DEVICE

BACKGROUND OF THE INVENTION

1. Field of the Invention

This invention relates to a camera setting device.

More particularly, it relates to an arrangement for setting a camera in dependence upon the speed or other characteristics of film being used in the camera.

2. The Prior Art

A major source of errors in the use of cameras, leading to spoiled pictures, is the use of the wrong type of film for a particular application. For example, if the camera user selects a certain lens opening and/or exposure time, being unaware that the camera is loaded with a type of film not suitable for these, the resulting picture will almost certainly be spoiled.

To avoid such problems it has been proposed to provide cameras with a mechanical feeler which senses a film sensitivity mark that is fixedly formed on a film cartridge or film cassette. Such devices are disclosed in German Pat. Nos. 1,216,682 and 864,803, as well as in German Published Application No. 1,447,486. The actual setting of the camera variables (aperture size; exposure time), based upon the detected film sensitivity, is as a rule effected manually by the user, since to date there has been no standardization of film-sensitivity marks on cartridges or cassettes, and of camera-mounted sensors which are compatible therewith. Therefore, most film-sensitivity-dependent-camera settings continue to be made by hand.

In the commonly owned application of Otto Stemme et al., Ser. No. 928,415, filed July 26, 1978, a film-characteristic indicator has been proposed which can be releasably connected with a film cassette, but only in a predetermined orientation relative thereto. This indicator has a mark indicative of a characteristic (i.e., usually speed) of the film in the cassette and the mark can be scanned by the camera scanning arrangement. When a cassette provided with such an indicator is inserted into a camera having appropriate scanning arrangement, the camera functions are automatically set for the detected film characteristic. This arrangement has only one drawback, namely that it does not permit manual setting of the camera functions in question, if for some reason a film cassette is used which does not have the indicator connected to it. Since this may sometimes be unavoidable, correction of this drawback is important.

SUMMARY OF THE INVENTION

Accordingly, it is an object of the invention to correct the aforementioned drawback.

More particularly, it is an object of the invention to provide an arrangement wherein the film-characteristic-dependent settings of a camera can be carried out manually, as well as an automatic response to the insertion into the camera of a film cassette having a film-characteristic indicator thereon. This permits the camera to be set by hand when a cassette is used without such an indicator.

Another object of the invention is to provide such an arrangement which visually indicates to a user the characteristic of a film in the camera, when the camera functions have been set in automatic response to insertion of a cassette into the camera.

A concomitant object is to provide an arrangement of the type under discussion, which is relatively simple in its construction and therefore reliable in operation.

Still a further object is for the arrangement to be inexpensive.

In keeping with these objects, and with others which will become apparent hereafter, one feature of the invention resides in a camera, a combination comprising a housing having a chamber for a film container; manually operable means for setting at least one camera function in dependence upon a characteristic of film being used in the camera; scanning means for scanning a film container introduced into the camera to determine the presence or absence of a film-characteristic mark on the container; and means for operating the manually operable means in response to detection of the presence of a film-characteristic mark on the container, and as a function of the characteristic indicated by the detected mark.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE is a fragmentary, partly broken-away, perspective view illustrating one embodiment of the invention.

DETAILED DESCRIPTION OF A PREFERRED EMBODIMENT

In the FIGURE the reference numeral 1 designates a fragmentarily illustrated camera housing, which is in part broken away to show one end of a film chamber 2 for a film cassette 16. The walls bounding the chamber 2 are formed with openings 3, 3' through which portions of two control levers 4, 5 extend from outside into the chamber 2.

The lever 4 has projections 6, 7 and 8 of one piece therewith and is pressed against a wall bounding the chamber 2 by a (not illustrated) biasing means, e.g., a spring, in the direction indicated by the arrow 14. Accordingly, the projection 6 extends through the opening 3 into chamber 2 and the projection 8 enters into a receiver (recess) 15 formed in the housing 1.

Also mounted on the housing 1, on the outside thereof, is a turnable knurled knob 10 provided with indicia which are e.g., indicative of the speed of film being used in the camera. This knob 10 can be turned manually, to set e.g., the film speed in question and hence may be considered to constitute manually operable means. It is held in the selected setting by arresting means provided for this purpose, namely engagement of the projection 7 of lever 4 with the knurling 20 on the knob. The knob 10 is linked internally of the camera with the actual setting instrumentalities (in a manner known per se and therefore not requiring discussion), so that selecting of a certain film speed with the knob results in setting the aperture size and/or exposure time of the camera as a function of this selection.

The lever 5 is located between the knob 10 and the camera wall on which the same is turnably mounted. Lever 5 is provided with a cut-out (not shown) or otherwise configurated so as not to interfere with the shaft (not shown) of knob 10. The lever 5 is pivotable about a pin 5' which mounts it on the housing 1; it has a slot 13 into which a pin 12 slidably extends. The pin 12 is embedded or otherwise secured to knob 10 so as to turn with the same. A torsion spring 9 is mounted on pin 5' and has two arms which respectively abut against a fixed stop 1a on housing 1 and against a pin 11 carried by the lever 5. A projection 18 of lever 5 extends through opening 3' into the film chamber 2 and constitutes film-characteristic scanning means, as will be explained later.

In the absence of engagement between projection 7 and the knurling 20, the spring 9 tilts lever 5 about pin 5' in anti-clockwise direction; this causes slot 13 to take along the pin 12 and via the same to turn the knob 10, also anti-clockwise, to the lowest setting (e.g., here the illustrated DIN 18 film speed setting). When knob 10 is manually turned in clockwise direction to select a different setting, this is done against the urging of spring 9 and tilts lever 5 anti-clockwise. During such turning the projection 7 ratchets over the knurling 20; it arrests the knob 10 in the selected position.

Manual operation is for those circumstances in which a film cassette is used which does not have a film-characteristic indicator. If, however, a cassette 16 is used which is provided with such an indicator 17 (corresponding to the one disclosed in copending application Ser. No. 928,415 which is incorporated herein in its entirety), then setting of the camera is effected automatically.

This is because, on insertion of the cassette 16 with the indicator 17 into the film chamber 2, an abutment edge 21 (whose location is indicative of e.g., the sensitivity of film in the cassette) on indicator 17 engages the projection 18 and pivots the lever 5 clockwise during progressive insertion of the cassette. Since lever 5 is coupled with knob 10 via the pin-and-slot coupling 12, 13, this causes knob 10 to turn in clockwise direction, to an extent determined by the clockwise tilting of lever 5, the degree of which is in turn a function of the location of abutment 21, i.e., of the distance of abutment 21 from the edge 17a. Such turning sets the camera as a function of the film sensitivity and, due to the turning of the knob 10, also visually indicates to the camera user the speed of the film which is presently in the camera. Turning of the knob 10 in this manner is made possible by engagement of an abutment 19 on indicator 17 with the projection 6 of lever 4. Such engagement displaces lever 4 (rightwards in the FIGURE) to an extent sufficient to disengage projection 7 from the knurling 20. Elements 6, 12 and 13 effect disengagement of the arresting means and mechanically set the knob 10, so that they may be thought of as disengaging means in conjunction with lever 5.

The manual or automatic setting of the camera, as described above, remains unchanged until it is subsequently varied, either manually or automatically.

The invention thus permits a camera to be set either manually or automatically, in accordance with the requirements imposed by the use of a film having a particular characteristic (e.g., speed). The solution according to the invention is relatively inexpensive and, because it is simple, also largely resistant to malfunctions. The manual and automatic setting procedures do not interfere with one another. The lever movements created by manual setting and those created by automatic setting in effect complement one another; i.e., during manual setting the lever movements for automatic setting are performed but in an "idle" mode, and vice versa. Since the knob 10 always turns, even during automatic setting, the user can immediately determine what type of film is in the chamber 2. The abutments or camming surfaces 19, 21 and/or still others could, of course, also be formed directly on a film cassette, instead of the indicator 17.

While the invention has been illustrated and described as embodied in a still camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera, a combination comprising a housing having a chamber for a film container; manually operable means movable to any of a plurality of positions for manually setting at least one camera function in dependence upon a characteristic of film being used in the camera; arresting means for arresting the manually operable means in the respectively set positions; scanning a means for scanning a film container introduced into the camera to determine the presence or absence of a film-characteristic mark on the container; and combined means for disengaging said arresting means and for thereupon mechanically operating said manually operable means, in response to detection of the presence of a film-characteristic mark on the container and as a function of the characteristic indicated by the detected mark.

2. A combination as defined in claim 1; and further comprising an indicator member detachably connectable to the film container and provided with at least two camming surfaces, at least one of which constitutes said mark.

3. A combination as defined in claim 1, said mark being constituted by camming surfaces formed on the film container.

4. A combination as defined in claim 1, said arresting means having an arresting device, and said combined means including a first lever which overrides said arresting device and a second lever which moves said manually operable means to one of said positions in response to and as a function of the detection of a film-characteristic mark on the film container.

5. A combination as defined in claim 4, said manually operable means and said second lever being coupled for joint movement by a pin-and-slot coupling of said combined means so as to each share the movement of the other.

* * * * *